(12) United States Patent
Mori et al.

(10) Patent No.: US 7,876,066 B2
(45) Date of Patent: *Jan. 25, 2011

(54) MULTI-COMPONENT CHARGING STATION WITH SURGE PROTECTOR

(75) Inventors: Kenneth Mori, Los Angeles, CA (US); Yoko Iida, Tokyo (JP)

(73) Assignee: Belkin International, Inc., Playa Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/636,360

(22) Filed: Dec. 11, 2009

(65) Prior Publication Data

US 2010/0090646 A1    Apr. 15, 2010

Related U.S. Application Data

(63) Continuation of application No. 11/147,676, filed on Jun. 8, 2005, now Pat. No. 7,652,452.

(51) Int. Cl.
*H02J 7/00*    (2006.01)
*H01H 9/02*    (2006.01)

(52) U.S. Cl. .................... 320/107; 320/114; 174/53
(58) Field of Classification Search .................. 320/114; 361/626
See application file for complete search history.

(56) References Cited

U.S. PATENT DOCUMENTS

| | | | | |
|---|---|---|---|---|
| 5,836,212 A | * | 11/1998 | Bates | 74/502.6 |
| 6,218,796 B1 | * | 4/2001 | Kozlowski | 318/280 |
| 6,844,494 B1 | * | 1/2005 | Nevins | 174/53 |
| 7,038,126 B2 | * | 5/2006 | Solet | 174/50 |
| 7,189,106 B2 | * | 3/2007 | Young | 439/501 |
| 2002/0096509 A1 | * | 7/2002 | Von Mosshaim | 219/452.11 |

FOREIGN PATENT DOCUMENTS

JP    2004135904    *    5/2004

* cited by examiner

*Primary Examiner*—Edward Tso
*Assistant Examiner*—Ahmed Omar
(74) *Attorney, Agent, or Firm*—Bryan Cave LLP (57) ABSTRACT

A charging station is provided for charging portable electronic devices. In one preferred embodiment of the invention, the charging station includes a surge protector located within the charging station. The charging station includes a base for housing the surge protector, a removable base cover that can be placed over the base and a removable tray that can be placed over the base or over the base cover if the base cover is in place over the base. If desired, the charging station can be used in a disassembled form by placing the tray on one surface and the base on another. If the charging station is used in this manner, the base cover can be placed over the base.

20 Claims, 6 Drawing Sheets

MULTI-COMPONENT CHARGING STATION WITH SURGE PROTECTOR

CROSS-REFERENCE TO RELATED APPLICATIONS

This is a continuation application of U.S. application Ser. No. 11/147,676 filed Jun. 8, 2005. U.S. application Ser. No. 11/147,676 is incorporated herein by reference.

FIELD OF THE INVENTION

This invention relates generally to multi-component charging stations with surge protectors for charging and protecting portable electronic devices.

BACKGROUND OF THE INVENTION

Almost all of the increasing number of available portable electronic devices, including telephones, personal digital assistants (PDAs), digital cameras, mp3 players, and so forth, routinely depend upon batteries as a power source. For convenience and to ease battery replacement costs, rechargeable batteries have found wide utility in powering contemporary consumer and business products. For example, nickel cadmium batteries may be used to energize portable electronic devices and then repeatedly recharged and reused. Rechargeable batteries are typically recharged by plugging an AC-powered charger unit into the portable electronic device and into an AC power wall receptacle. The AC-powered charger unit typically converts 110 or 120 volt AC current from an outlet to low voltage DC power used to recharge the batteries. Without some sort of management system, the number of electronic devices that need to be recharged and the charger units associated with each electronic device can quickly become both unsightly and unwieldy.

The increase in the number of portable electronic devices has lead to the introduction of battery charging stations that provide a mechanism for charging rechargeable batteries. Such stations are convenient and useful, but are inadequate in that they only recharge certain types of devices, are difficult to use, do not incorporate a surge protector and are not multi-functional. Accordingly, there exists a need for a battery charging system that provides a mechanism for charging a variety of devices, increases the number of devices that can be charged at the same time, incorporates a surge protector and also holds other objects that do not need to be charged, such as a wallet or keys.

SUMMARY

Accordingly, it is an object of the present invention to provide a battery charging station that overcomes the detriments of the prior art. The present invention is a multi-component charging station. The charging station includes a top removable tray for holding electronic devices, such as telephones, pagers, personal digital assistants (PDAs), wireless e-mail devices, digital cameras, mp3 players. The tray can also hold and the charging station can also power battery charging units that are separate from the portable electronic devices. The tray of the multi-component charging station is substantially flat to receive and hold a variety of objects. In one preferred embodiment of the invention, the tray portion of the battery charging station has a raised perimeter wall to prevent objects placed on the tray from falling off. The charging station also includes a base that houses a surge protector having multiple AC outlets. The surge protector within the base can power multiple charger units at once and protect the units from surges or spikes in power. The base can be covered by a removable base cover. The base cover is particularly useful when the tray and base are positioned separately. For example, the tray holding the portable electronic devices and other small objects can be placed on a table, while the base is placed on the floor. Then, the base cover can be placed on top of the base to conceal the surge protector, outlets, and the charger units.

In another preferred embodiment of the invention, the charging station contains an opening that leads to the interior space of the base. The opening can be located in the base cover, in the tray or in the base part. The opening permits at least one portable electronic device to be connected to its associated charger unit plugged into the surge protector within the interior space. In another preferred embodiment, a second opening is located within the charging station to permit the surge protector to be plugged into an external outlet.

In another preferred embodiment of the invention, the opening located within the charging station is fitted with a grommet. In another preferred embodiment of the invention, the grommet has multiple openings that permit the cord from each charger unit to connect to its associated electronic device through one of the openings in the grommet and the opening in the charging station to the electronic device located on the tray.

In another preferred embodiment of the invention, the perimeter wall of the tray contains at least one indentation extending from the interior surface of the perimeter wall to the outer surface of the perimeter wall. Thus, when at least one electronic device is positioned on the tray, the cord from the charger unit can be routed to the electronic device through the indentation.

In another preferred embodiment of the invention, the perimeter wall of the tray contains at least one indentation extending from the interior surface of the perimeter wall to an opening in the perimeter wall that leads to the surge protector and outlet within the interior space.

In another preferred embodiment of the invention, the charging station is integrated as a universal serial bus (USB) hub.

In another preferred embodiment of the invention, the charging station is integrated with a circuit breaker switch.

In another preferred embodiment of the invention, the charging station is integrated with at least one additional outlet.

BRIEF DESCRIPTION OF THE DRAWINGS

The invention will be better understood from a reading of the following detailed description, taken in conjunction with the accompanying figures in the drawings in which.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

The multi-component charging station according to the present invention allows a plurality of rechargeable portable electronic devices to be connected to AC-powered charger units for recharging either individually or simultaneously by placing the electronic devices on the tray of the multi-component charging station. The charger unit cord for each portable electronic device is then fed through at least one opening within the charging station from an AC outlet protected by a surge protector within the interior space of the charging station to the associated portable electronic device. These portable electronic devices include, but are not limited to mobile phones, personal digital assistants (PDAs), digital cameras, mp3 players, CD players, cassette players, pagers, walkie talkies, gaming systems, and other rechargeable electronic devices. Because of the open tray feature, the present invention allows multiple electronic devices to be recharged or stored simultaneously and virtually any type of portable electronic device can be recharged. Further, the present invention allows for the storage of other small objects that do not need to be recharged, such a wallet or keys.

Figure 1:
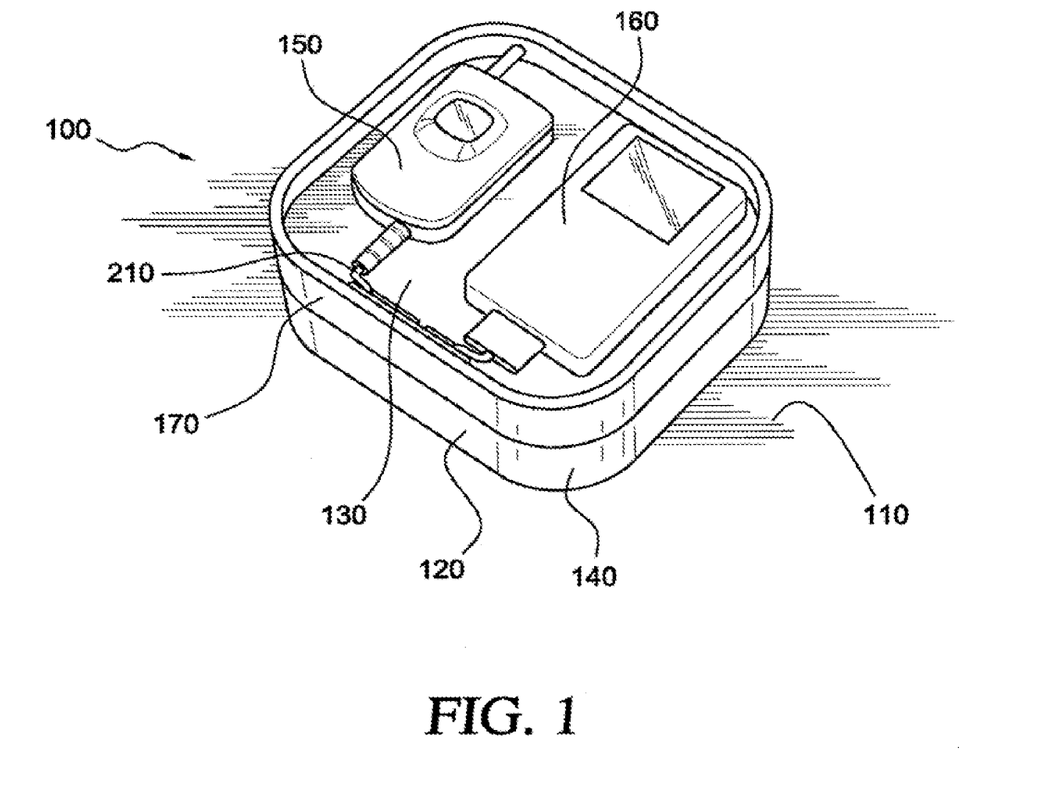
FIG. 1 is an illustration of a charging station positioned on a table according to a preferred embodiment of the invention.

Referring now to the figures, FIG. 1 is a top view of a charging station 100 according to a preferred embodiment of the invention positioned on top of a surface 110, such as a table. As illustrated in FIG. 1, charging station 100 has multi-components. In FIG. 1 the tray 130 is placed on top of the base 140. Although not visible in FIG. 1, a base cover 190 can also be placed between the tray 130 and the base 140. The tray 130 is capable of storing portable electronic devices, including, for example, a mobile telephone 150 and an mp3 player 160. In one preferred embodiment of the invention, the tray 130 has a raised perimeter wall 170 that prevents objects that are positioned on the tray 130 from falling off.

Figure 2:
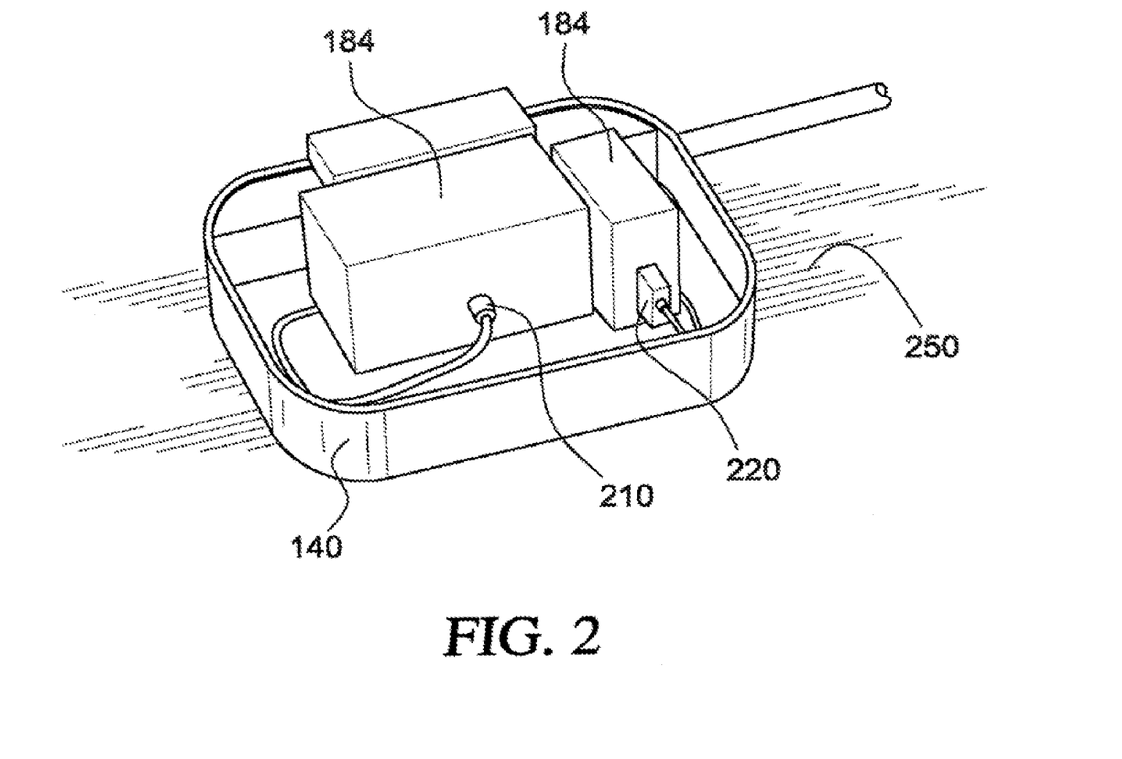
FIG. 2 is an illustration of the base of the charging station according to a preferred embodiment of the invention.

FIG. 2 is an illustration of the base 140 of the charging station 100 according to a preferred embodiment of the invention. The base 140 houses a surge protector 180 which is powered by AC power provided from a 110 or 120 volt outlet 182 through a power cord 183. The surge protector 180 can provide power through multiple outlets 182 in the base. Each outlet 182 is capable of receiving a charger unit 184. Thus, the charging station 100 can charge multiple devices at once and protects the devices from surges or spikes in power. In one preferred embodiment, the outlets 182 are sufficiently spaced apart to accept AC adaptor blocks. In another preferred embodiment, the outlets 182 are repositionable via a short pigtail cord to accept AC adaptor blocks.

Figure 3:
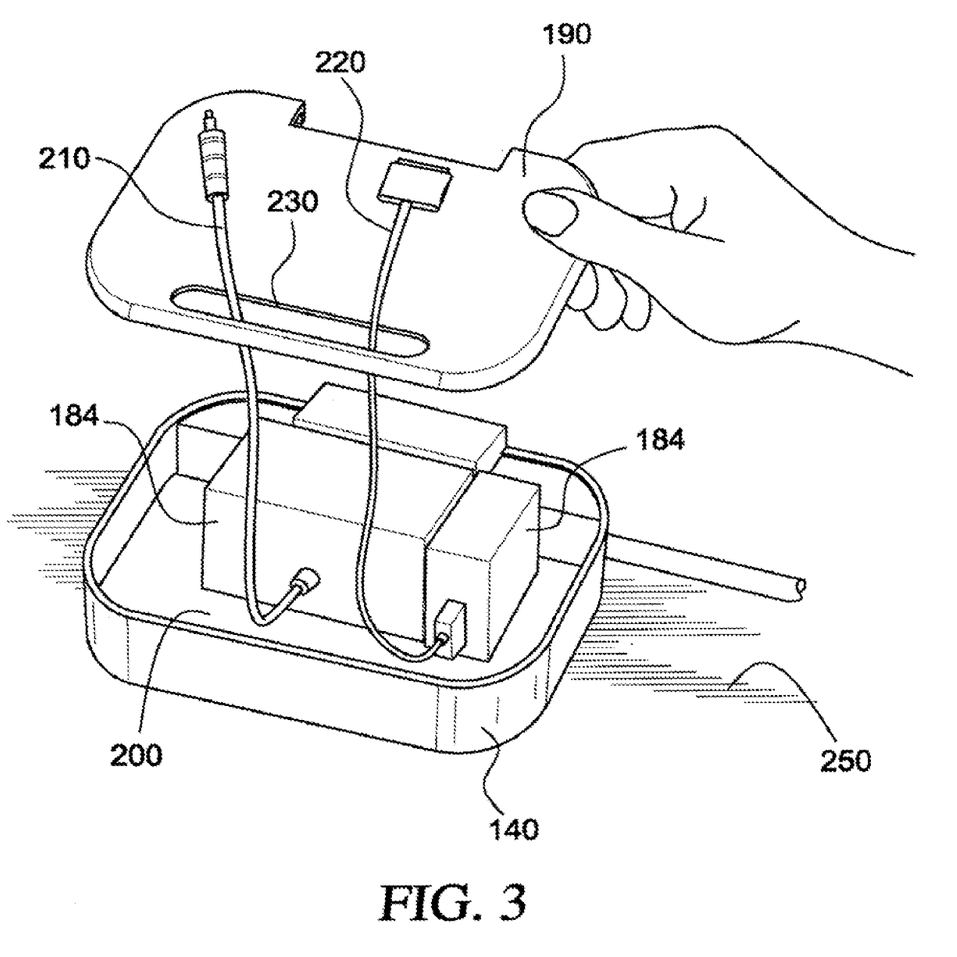
FIG. 3 is an illustration of the base and base cover of the charging station according to a preferred embodiment of the invention.

FIG. 3 is an illustration of the base 140 and base cover 190. As illustrated in FIG. 3, a base cover can be placed on top of the base to enclose an interior space 200 and conceal the surge protector 180.

Figure 4:
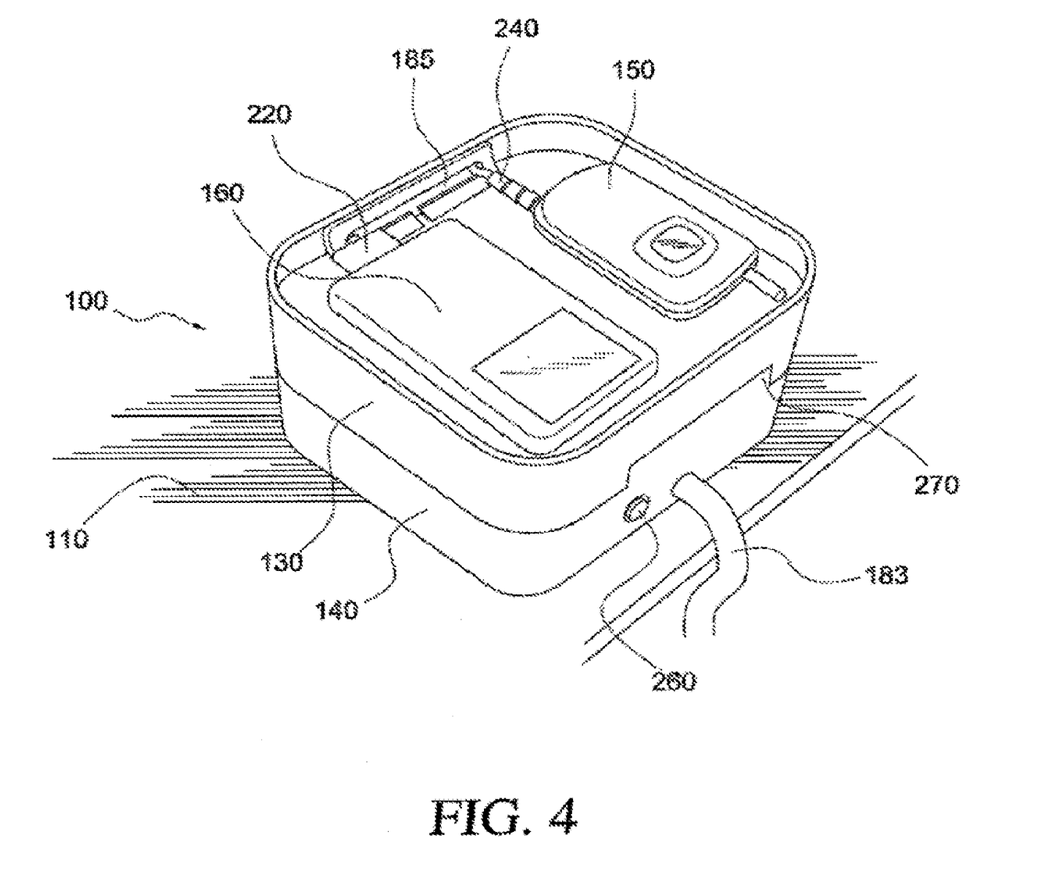
FIG. 4 is an illustration of a charging station with an external outlet according to another preferred embodiment of the invention.

FIG. 4 is an illustration of the charging station 100. As illustrated in FIG. 4, the tray 130 and preferably the perimeter wall 170 of the tray 130 has a first opening 185. The first opening 185 permits the charger cord for at least one portable electronic device, for example, as illustrated in FIG. 4, the mobile phone charger cord 210 and mp3 charger cord 220 to be fed through the first opening 185 from the interior space 200 within the base 140 where the charger unit 184 is connected to the surge protector 180. As illustrated by FIG. 3 there is preferably a second opening 230 in the base cover 190. When the removable base cover 190 is placed on top of the base 140, the second opening 230 allows charger cords, for example the mobile phone charger cord 210 and mp3 charger cord 220 to be fed through the second opening from the interior space 200 within the base 140 where the charger units 184 are connected to the surge protector 180.

As illustrated in FIG. 4, in one preferred embodiment of the invention, a grommet 240 can be inserted into the first opening 185. The grommet 240 can be used to provide support for the charger cords, for example the mobile phone charger cord 210 and mp3 charger cord 220 illustrated in FIG. 4, so that the mobile phone charger cord 210 and mp3 charger cord 220 can easily fit through the first opening 185. Further the grommet 240 can also serve as a decorative feature. In one preferred embodiment of the invention, the grommet 240 can have multiple openings. Each opening can serve to permit access of one charger cord from the interior space 200 within the base 140 to the tray. A second grommet can also be utilized for the second opening 230 within the base cover 190. Such a second grommet is particularly useful if the base cover 190 is being utilized and will not be covered by the tray 130.

Figure 5:
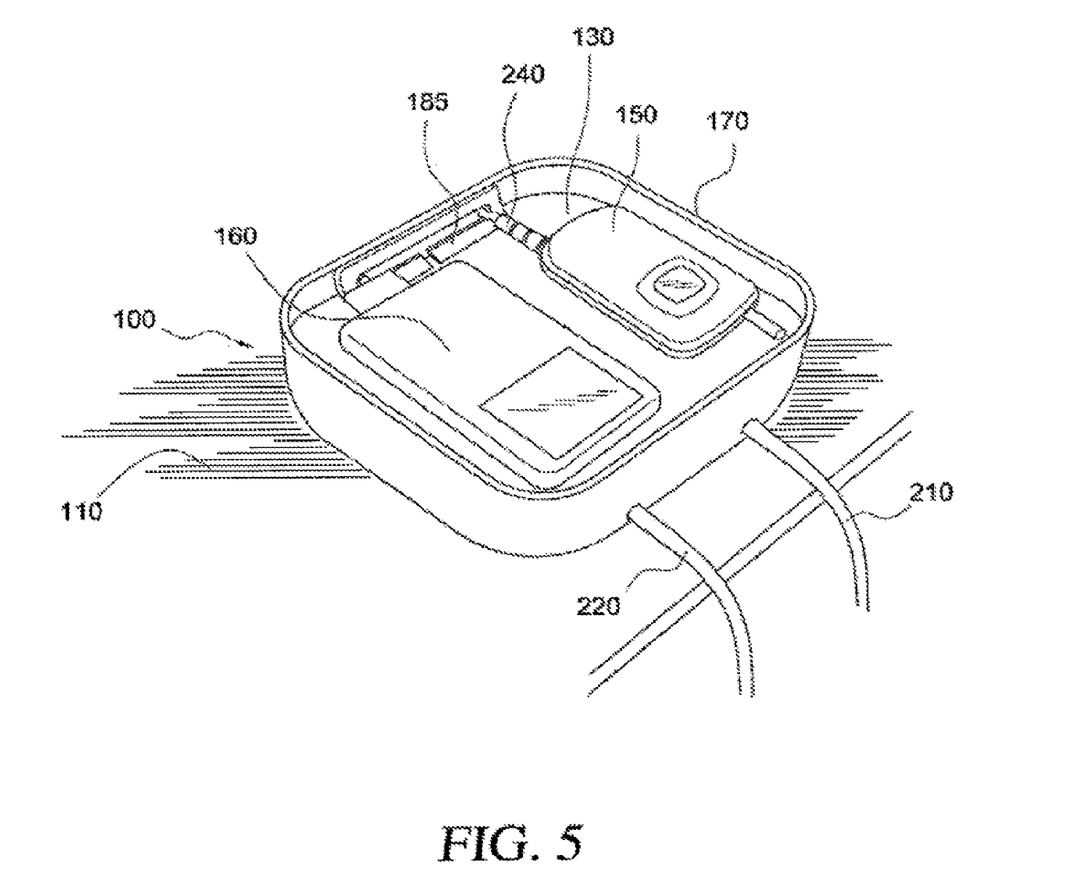
FIG. 5 is an illustration of the tray of the charging station according to a preferred embodiment of the invention.
Figure 6:
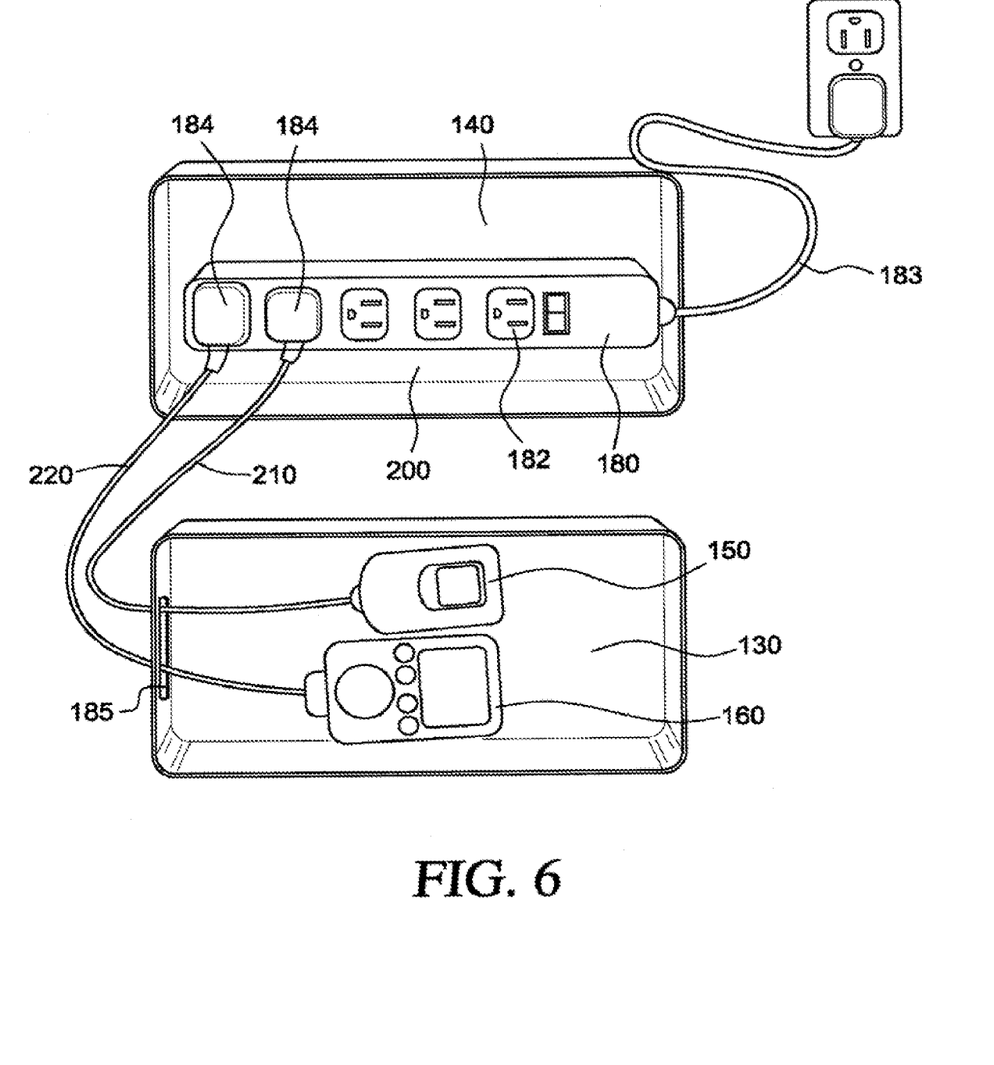
FIG. 6 is an illustration of base and tray of the charging station with an external outlet according to a preferred embodiment of the invention.

FIG. 5 and FIG. 6 are illustrations of the tray 130 of an unassembled charging station 100. One of the benefits of the invention is the multi-component aspect to the charging station 100. The tray 130 portion of the charging station 100 can be used separately from the remainder of the charging station 100, specifically the base 140 and if desired, the base cover 190. For example, the tray 130 holding at least one portable electronic device, as illustrated in FIG. 5, the mobile phone 150 and mp3 player 160, can be place on a surface 110, such as a table, while the base 140, as illustrated in FIG. 2 is positioned on a second surface 250, such as the floor. If the charging station 100 is used in this manner, the charger cords, as illustrated in the FIG. 5, will run from the tray through the first opening 185 off the surface 110 toward the second surface 250 to the base 140 that is positioned on the floor 250. In this preferred embodiment, the base cover 190 is can be particularly useful when the tray 130 and base 140 are located on separate surfaces. The base cover 190 can be used on top of the base 140 to hide the surge protector 180 and charger units 184. Of course, if it is desired that the tray 130 or base 140 be placed on other surfaces, other than a table or floor, or other locations on the same surface, the multi-functional aspect to the disclosed invention permits such flexibility.

In one preferred embodiment of the invention, the base cover 190 can be affixed to the base 140 using a closure mechanism, including but not limited to resilient interference means or a locking mechanism. In another preferred embodiment of the invention, the tray 130 can be affixed to the base 140 or base cover 190 using a closure mechanism, including but not limited to resilient interference means or a locking mechanism.

In yet another preferred embodiment of the invention, the perimeter wall 170 of the tray contains at least one indentation that runs from the inner surface of the perimeter wall 170 to the outer surface of the perimeter wall 170. When at least one electronic device is placed on the tray 130, the charger cord from the electronic device can be placed within the indentation.

In another preferred embodiment of the invention, the perimeter wall 170 contains at least one indentation that runs from the inner surface of the perimeter wall 170 to an opening in the perimeter wall 170. When at least one electronic device is placed on the tray 130, the charger cord from the electronic device can extend from the interior space in the base 140, to the opening, along the indentation to the top of the tray 130.

In other preferred embodiments of the invention, the charging station 100 can be integrated with additional features such as with a USB hub, a circuit breaker switch 260, and/or at least one additional outlet 270 accessible from the exterior of the base to permit other electrical devices to be powered.

The charging station 100 of the present invention eliminates the need for multiple charging stations or modules. The charging station 100 according to the present invention provides a distinct advantage over prior art systems because it is designed to be used with a plurality of portable electronic devices or battery charging units and is not limited to being used with a specific electronic device or battery charging units. Because of the structure the charging station 100 and particularly the tray 130 feature, a plurality of portable electronic devices, regardless of size or shape can be simultaneously or individually, stored and recharged.

Thus, in one aspect, the present invention provides, a charging station for receiving a portable electronic device and a charger unit for charging a portable electronic device. The charging station comprises a base, a generally planar base cover and a tray. The base comprises a generally planar bottom surface bounded by a perimeter wall. The base cover is removably attached to the upper portion of the perimeter wall of the base to enclose an interior space for housing a surge protector and a charger unit powered by the surge protector. The base cover also has an opening to permit a charger cord extending from a charger unit located within the interior space to pass through the base cover. The tray comprises a generally planar surface for receiving at least one portable electronic device. The tray is configured for removable attachment to the upper surface of the base cover. The tray also has an opening to permit a charger cord to pass through the tray. A surge protector is located within the interior space comprising outlets for providing regulated power to a charger unit for charging a portable electronic device.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the charging station discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A charging station for receiving a portable electronic device and receiving a charger unit for charging the portable electronic device, the charger unit having a charger cord, said charging station comprising:
   a base comprising a bottom surface bounded by a perimeter wall, the perimeter wall having an upper portion;
   a base cover removably attachable to the upper portion of the perimeter wall of the base to enclose an interior space, said base cover having an opening to permit the charger cord of the charger unit located within the interior space to pass through the base cover, the base cover comprising an upper surface;
   a tray comprising a first surface for receiving the portable electronic device, the tray configured for removable attachment to the upper surface of the base cover, the tray having an opening to permit the charger cord of the charger unit to pass through the tray; and
   a power strip located within the interior space, the power strip comprising outlets for providing electrical power to the charger unit for charging the portable electronic device,
   wherein:
   the upper surface of the base cover is a first exterior surface of the charging station when the base cover is attached to the upper portion of the perimeter wall of the base and the tray is not attached to the upper surface of the base cover;
   the first surface of the tray is the first exterior surface of the charging station when the base cover is attached to the upper portion of the perimeter wall of the base and the tray is attached to the upper surface of the base cover; and
   the upper surface of the base cover is an interior surface of the charging station when the base cover is attached to the upper portion of the perimeter wall of the base and the tray is attached to the upper surface of the base cover.

2. The charging station of claim 1 wherein the first surface of the tray is substantially rectangular.

3. The charging station of claim 1 wherein the tray is configured for resting on a generally planar surface.

4. The charging station of claim 1 wherein the tray is bounded by a perimeter wall.

5. The charging station of claim 1 wherein the base cover opening is fitted with a grommet.

6. The charging station of claim 5 wherein the grommet has multiple openings.

7. The charging station of claim 1 wherein the tray opening is fitted with a grommet.

8. The charging station of claim 7 wherein the grommet has multiple openings.

9. The charging station of claim 1, wherein:
the base cover is removably attachable to the base using a closure mechanism.

10. The charging station of claim 1, wherein:
the tray is removably attachable to the base using a closure mechanism.

11. A charging station for receiving a portable electronic device and receiving a charger unit for charging the portable electronic device, the charger unit having a charger cord, said charging station comprising:
   a base comprising a generally planar bottom surface bounded by a perimeter wall, the perimeter wall having an upper part;
   a tray comprising a generally planar surface for receiving the portable electronic device, the tray removably attachable to the upper part of the perimeter wall of the base to enclose a first interior space, said tray having an opening configured to permit the charger cord of the charger unit to pass through the tray when the charger unit is located within the first interior space;
   a base cover removably attachable to the upper part of the perimeter wall of the base when the tray is not attached to the perimeter wall of the base to enclose a second interior space, the base cover having an opening to permit the charger cord of the charger unit to pass through the base cover when the charger unit is located within the second interior space; and
   a surge protector located within the first interior space when the tray is attached to the base and located within the second interior space when the base cover is attached to the base, the surge protector comprising outlets for providing regulated power to the charger unit for charging the portable electronic device,
wherein:
   the base cover is configured such that the base cover can be located between the tray and the base when the tray is attached to base;
   the generally planar surface of the tray is a top exterior surface of the charging station when the tray is attached to the base; and
   the base cover is the top exterior surface of the charging station when the tray is not attached to the base and the base cover is attached to the base.

12. The charging station of claim 11 wherein the generally planar surface of the tray is substantially rectangular.

13. The charging station of claim 11 wherein the tray is configured for resting on a generally planar floor surface.

14. The charging station of claim 11 wherein the tray is bounded by a perimeter wall.

15. The charging station of claim 11 wherein the tray opening is fitted with a grommet.

16. The charging station of claim 15 wherein the grommet has multiple openings.

17. The charging station of claim 11, wherein:
the tray is removably attachable to the base using a closure mechanism.

18. A charging station for receiving at least one portable electronic device, each of the at least one portable electronic device comprising a charger unit with a charger cord, the charging station comprising:
   one or more electrical connectors;
   a base comprising:
      at least one perimeter wall with an upper portion and a lower portion; and
      a bottom surface coupled to the lower portion of the at least one perimeter wall;
   a base cover configured to enclose an interior space for housing the one or more electrical connectors and the charger unit, the base cover comprising:
      a lower portion removably attachable to the upper portion of the at least one perimeter wall of the base; and
      an upper portion;
   a tray removably attachable to the upper portion of the base cover, the tray comprising:
      a receiving surface for receiving the at least one portable electronic device; and
      at least one perimeter wall extending from an edge of the receiving surface and at least partially surrounding the receiving surface,
wherein:
   the tray is also removably attachable to the upper portion of the at least one perimeter wall of the base;
   the receiving surface of the tray, at least a first portion of the at least one perimeter wall of the tray, at least a first portion of the at least one perimeter wall of the base, and the bottom surface of the base are at least part of four or more exterior surfaces of the charging station when the tray is attached to the base cover and the base cover is attached to the base;
   the receiving surface of the tray, at least a second portion of the at least one perimeter wall of the tray, at least a second portion of the at least one perimeter wall of the base, and the bottom surface of the base are at least part of the four or more exterior surfaces of the charging station when the tray is attached to the base and the base cover is not attached to the base;
   the upper portion of the base cover is interior to the charging station when the tray is attached to the base cover and the base cover is attached to the base;
   the upper portion of the base cover, at least a third portion of the at least one perimeter wall of the base, and the bottom surface of the base are at least part of the four or more exterior surfaces of the charging station when the tray is not attached to the base cover or the base and when the base cover is attached to the base;
   the base configured to rest on a first surface;
   the tray configured to rest on a second surface;
   the one or more electrical connectors are mechanically coupled to the base;
   the base cover having an opening to permit the charger cord to pass through the base cover; and
   the tray having an opening to permit the charger cord to pass through the tray.

19. The charging station of claim 18, wherein:
the tray is configured to rest on the second surface while the base is resting on the first surface; and
the first surface is different from the second surface.

20. The charging station of claim 18, wherein:
the tray is configured to rest on the second surface while the base is resting on the first surface; and
the first surface is the same as the second surface.

* * * * *